Oct. 11, 1927.  1,644,960
J. STAUSS
KEYBOARD INDICATING DEVICE AND METHOD OF REGISTERING PERFORMANCE
Filed Nov. 12, 1925  4 Sheets-Sheet 3

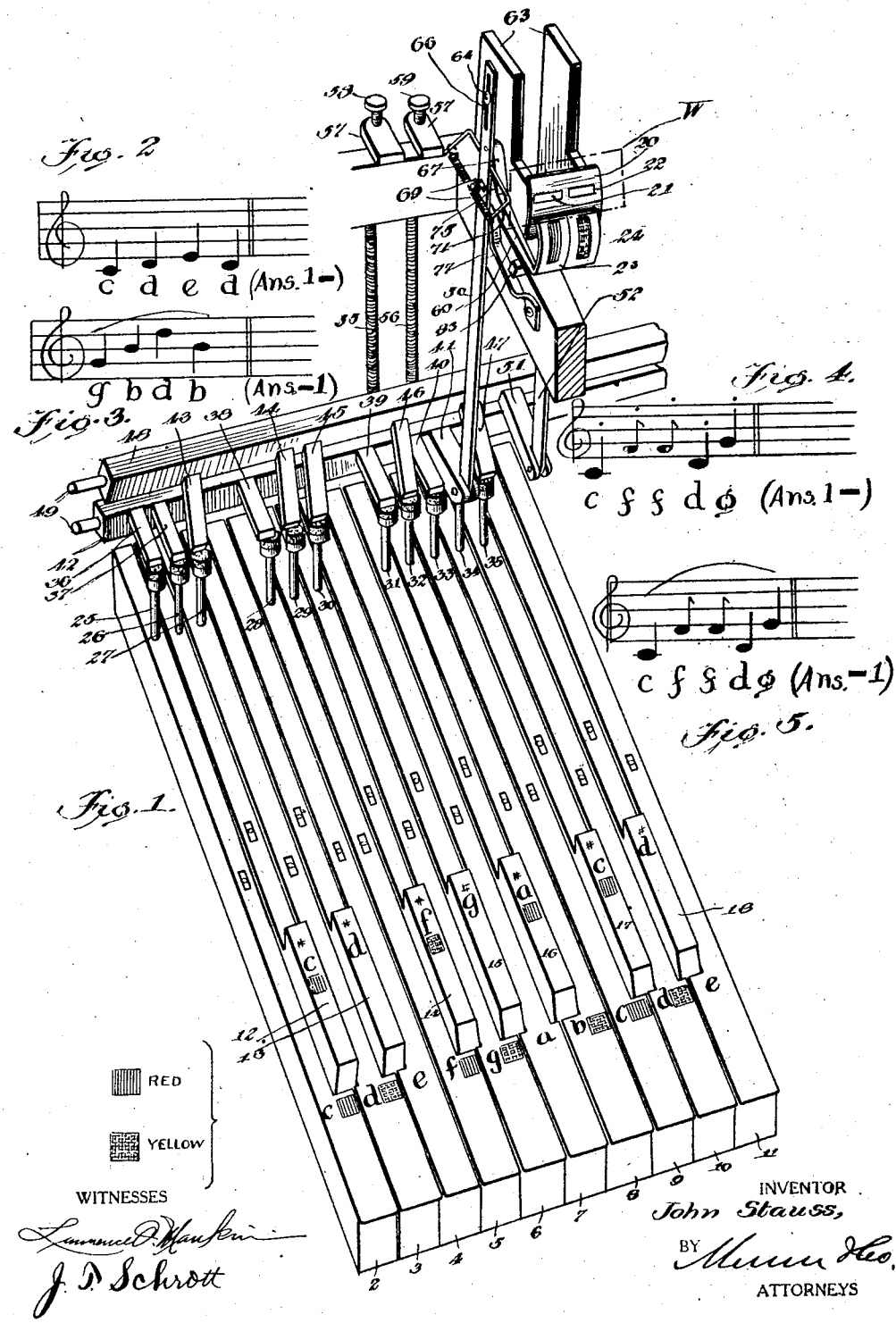

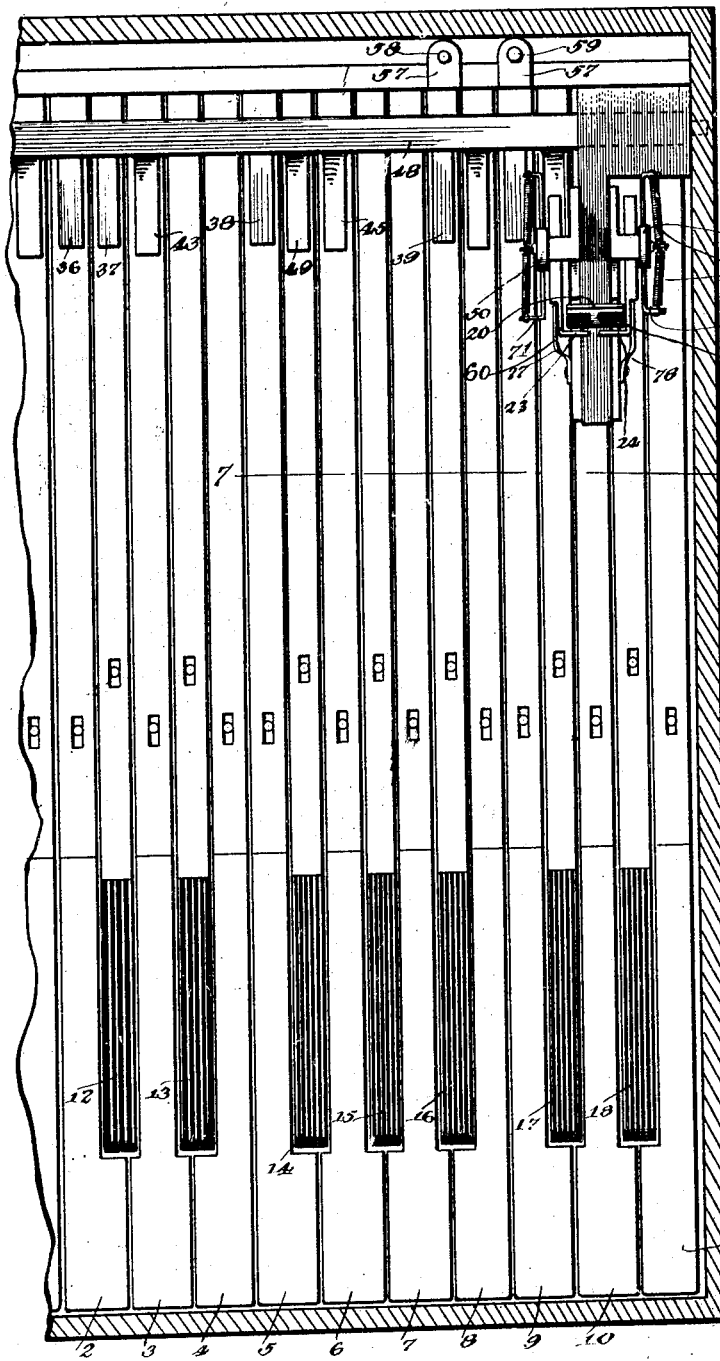

WITNESSES
INVENTOR
John Stauss,
BY
ATTORNEYS

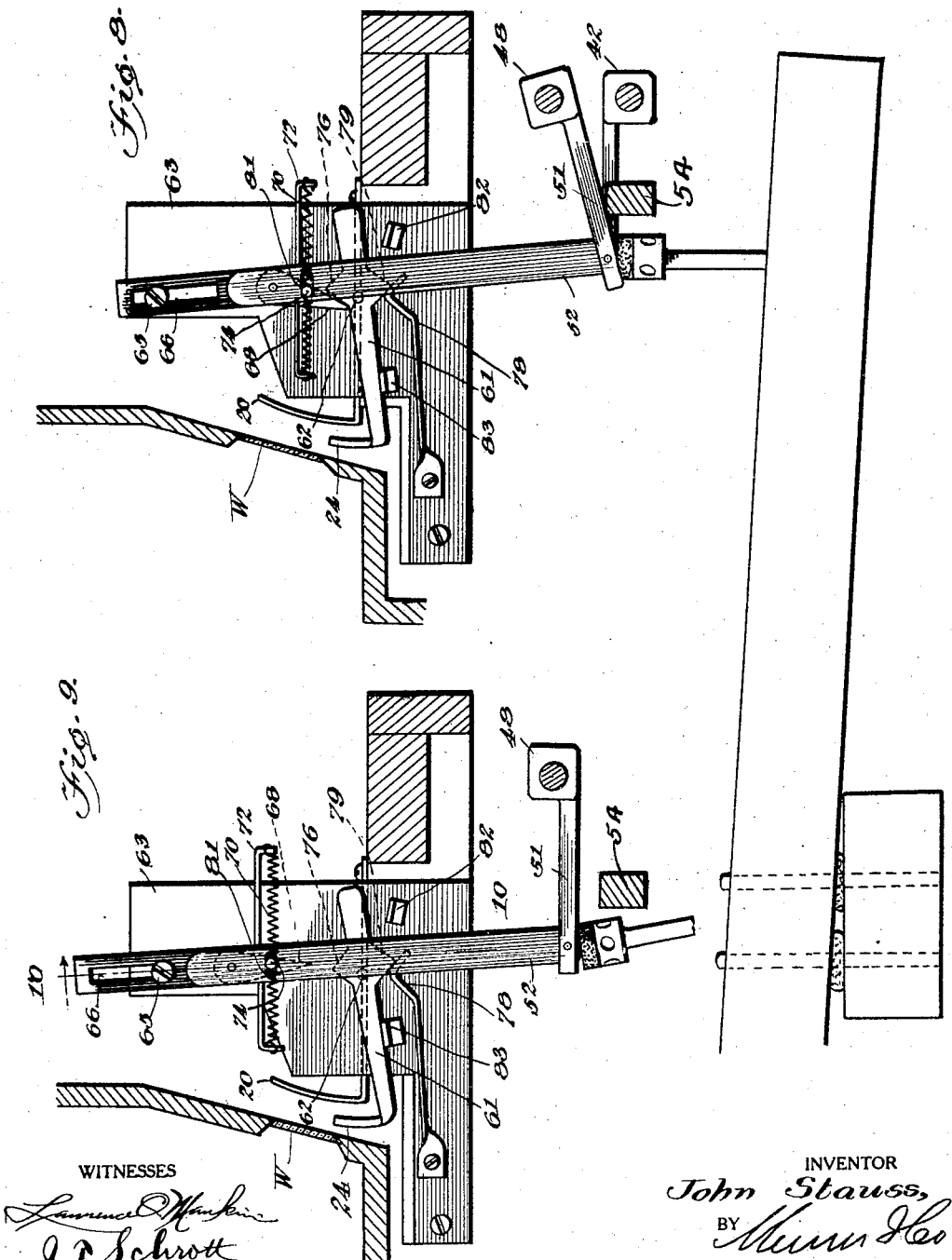

Patented Oct. 11, 1927.

1,644,960

UNITED STATES PATENT OFFICE.

JOHN STAUSS, OF NEW ORLEANS, LOUISIANA.

KEYBOARD INDICATING DEVICE AND METHOD OF REGISTERING PERFORMANCE.

Application filed November 12, 1925. Serial No. 68,660.

This invention relates to improvements in indicating devices and it consists of the constructions, combinations and arrangements herein described and claimed.

An object of the invention is to provide an indicating device which functions in connection with a manual keyboard, for example, as that of a piano, organ, dumbpiano, practice keyboard or substitute therefor, for the purpose of furnishing the student with a visible indication, or answer, within certain limitations, of the result of his efforts.

Another object of the invention is to provide an indicating device which is operated by the keyboard action of a piano or the like to furnish the student with a visible indication as to whether the particular exercise has been played correctly, the indication being according to a prescribed code.

Another object of the invention is to provide a method of registering manual performance upon a keyboard, the method involving a code the symbols of which are operated by the key board action in such a manner as to furnish a visible indication as to whether the exercise has been played correctly or not.

Other objects and advantages appear in the following specification, reference being had to the accompanying drawings, in which Figure 1 is a diagrammatic perspective view of a portion of a piano or other keyboard, illustrating the embodiment of the invention.

Figures 2 to 5 inclusive are brief musical exercises by the use of which the operation of the indicating device is subsequently demonstrated.

Figure 6 is a detail plan view of a fragment of the keyboard, parts being shown in section.

Figure 8 is a detail vertical section taken on the line 8—8 of Figure 7, the indicator and an associated piano being in the normal position.

Figure 9 is a similar sectional view illustrating the action upon depressing the key.

Figure 7:
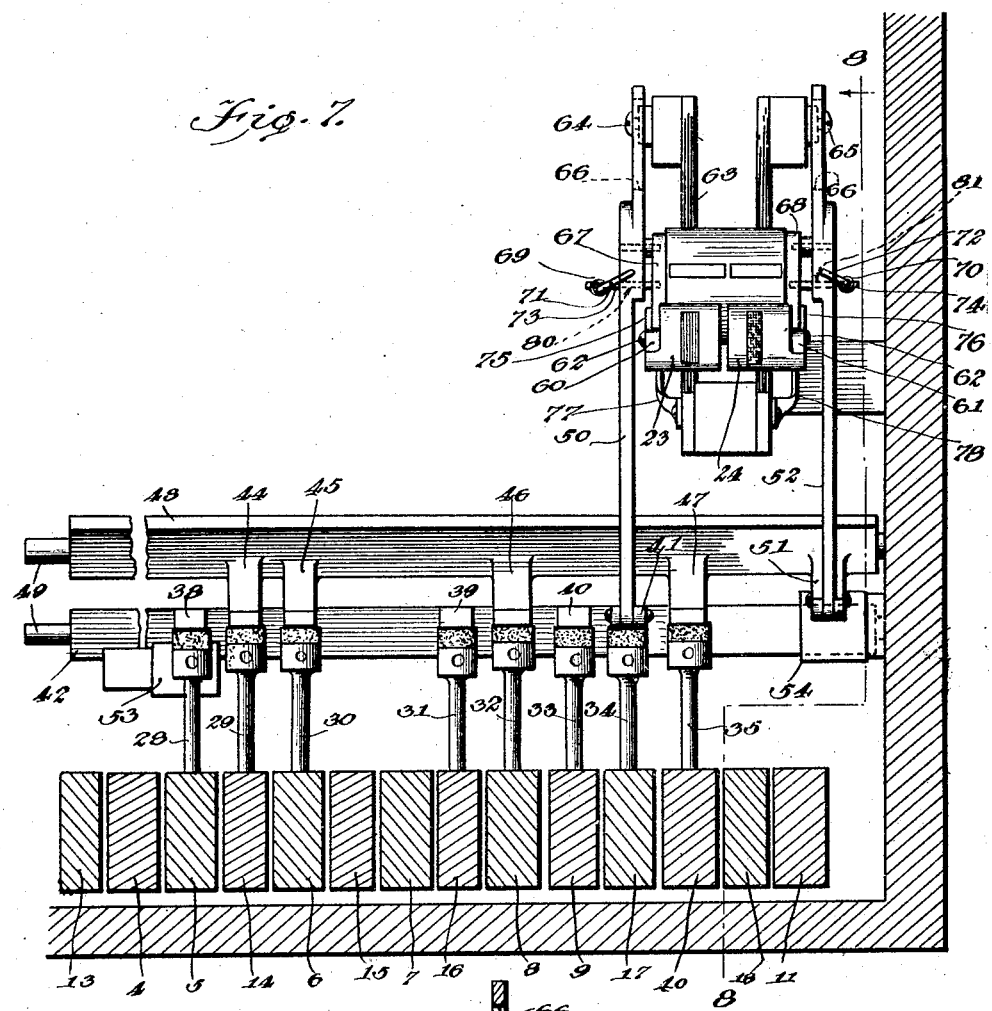
Figure 7 is a cross section on the line 7—7 of Figure 6.
Figure 10:
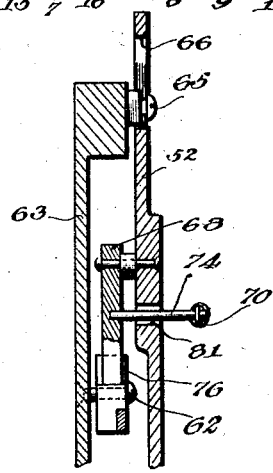
Figure 10 is a detail sectional view on the line 10—10 of Figure 9.

The fragmentary keyboard 1, is for convenience, herein regarded as that of a piano. Approximately one and one-third octave is shown, the various white keys being designated 2, 3, 4, 5, 6, 7, 8, 9, 10 and 11. These keys, in the order given bear the musical names C, D, E, F, G, A, B, C, D, E.

Certain ones of the keys are provided with colored marks accompanying the foregoing musical names which marks in the instance of the keys 2, 5 and 9 are red (see the chart accompanying Fig. 1) and in the instance of the keys 3, 6, 8 and 10 are yellow. The keys thus distinguished are herein known as "speaking" keys, those not so distinguished being "silent" keys in so far as the indicator is concerned.

That portion of the keyboard shown also includes black keys 12, 13, 14, 15, 16, 17, and 18. These carry the musical names C#, D#, F#, G#, A#, C#, D#, and like the white keys certain ones of the black keys have colored marks which distinguish them as "speaking" keys. The black keys 12, 16 and 17 have red marks. The black key 14 has a yellow mark. Those keys with no marks, are, as before, silent so far as the indicating device is concerned. In practice, the musical names and colored marks are omitted from the piano keys, but they are herein shown for the purpose of more definitely associating the device with the keys.

All red marked keys (marked red to show that they operate red indicator) form a unit, because each produces an identical result in the indicating device whether used singly or in any combination. The same is true of the yellow marked keys. The code for the visible indication previously mentioned consists of the character "—" and the figure "1". These by duplication and alternation, produce various combinations, and the answer to any particular exercise will be one particular one of these possible combinations.

One indicator comprises a red figure "1" on a shield 23, and the complementary dash 21 on the stationary member 20. The other indicator comprises the yellow figure "1" on a shield 24, and the complementary dash 22 also on the stationary member. The red indicator (the one with the red "1") agrees with the piano keys of the red unit, while the yellow indicator (the one with the yellow "1") agrees with the piano keys of the yellow unit.

The various "speaking" keys, taken in succession, have adjusting screws 25, 26, 27, 28, 29, 30, 31, 32, 33 and 35. The adjusting screws 25, 26, 28, 31, 33 and 34 of the red keys are individually capable of lifting tappets 36, 37, 38, 39, 40 and 41 of a transverse bar 42. The adjusting screws 27, 29, 30, 32 and 35 of the yellow keys are capable of operating the tappets 43, 44, 45, 46 and 47 of a transverse bar 48. These bars are pivoted at the ends, as indicated at 49.

The tappet 41 is converted into a connection to which the indicator plunger 50 is pivotally joined. The transverse bar 48 has an independent connection 51 to which the second indicator plunger 52 is joined. In practice the arrangement may be such that the plunger 52 is joined with one of the tappets of the bar 48 which, as in the instance of the tappet 41, may be converted to suit the purpose. Stops 53 and 54 limit the movement of the tappets of the respective bars 42 and 48 toward the various adjusting screws under the tension of springs 55 and 56 which are suitably connected with the respective bars. Brackets 57 on a fixed part of the framework carry screws 58 and 59 to which the upper ends of the springs are connected and by means of which adjustments as to tension are made.

Arms 60 and 61 carry the respective red and yellow indicators. These are pivoted at 62 on opposite sides of a common support 63 upon which the member 20 is stationarily mounted, and upon which the plungers 50 and 52 have guidance by virtue of the engagement of screws or other studs 64 and 65 in slots 66 (see Fig. 9) for example.

The plungers 50 and 52 carry pawls 67 and 68 which tend to be centered by twin springs 69 and 70. Yokes 71 and 72, fixed upon the respective plungers 50 and 52 provide support for the remote ends of the twin springs. Pins 73 and 74, extending from the pawls 67 and 68, carry the near ends of the springs. The springs are of equal pressures resulting in centering the pawls 67 and 68 in respect to cams 75 and 76 on top of the indicator arms 60 and 61. This centering occurs when the plungers are elevated as when any one of the keys in the red and yellow units are depressed.

Spring detents 77 and 78 engage detent cams on the indicator arms, as for example the cam 79 of the arm 61 (Figs. 8 and 9) for the purpose of keeping the indicator arms in position. The pairs of cams on each of the arms roughly define a diamond with the sides of which the pawls and spring detents so engage as to rock the indicator arms and then hold them in position after rocking.

Horizontal slots 80 and 81 (Figs. 1 and 8) provide room for the necessary movement of the pins 73 and 74 when the pawls slide down opposite sides of the cams 75 and 76.

Pairs of stops 82 and 83 (Figs. 8 and 9) limit the rocking movement of the indicator arms under the action of the plunger pawls.

The operation will be understood with the structure in mind. Depression of any red marked key will raise the plunger 50. Each of the keys is pivoted in the substantial center according to practice. Depression of the key 2, for example, will cause the adjusting screw 25 to raise the tappet 36, rock the transverse bar 42 upon its pivots 49 and raise the plunger 50, as stated, by virtue of its connection with the tappet 41.

Raising the plunger 50 will carry the pawl 67 clear of the cam 75 on the indicator arm 60 and thereby permit the twin springs 69 to center the pawl in respect to the plunger but off-center the pawl in respect to the cam 75. Upon release of the key 2, the pawl will slide down one side or the other of the cam 75 and rock the arm 60 upon its pivot. Depression of any one of the yellow keys will produce the same result at the plunger 52. The action is illustrated in Figs. 8 and 9. Upon depression of the key, the plunger 52 is moved from the position in Figure 8 to that in Fig. 9. The indicator shield 24 is in the depressed position, which in fact is always taken as the normal position, leaving the adjacent part of the stationary member 20 exposed. As soon as the pawl 68 is released from the cam 76 the twin springs at once center the pawl in respect to the plunger, but by virtue of the fact that the arm 61 is in the inclined position the action of the pawl 68 is that of off-centering in respect to the cam 76.

Release of the yellow marked key permits the return, or lowering of the plunger 52. The pawl 68 then slides down the right side of the indicator arm 61 (Fig. 9) causing rocking of the arm upon its pivot so that the shield 24 moves up in front of the adjacent portion of the stationary member 20 concealing the dash 22. Assuming both indicator arms to have been in the normally downwardly inclined position, the shield 23 will remain depressed disclosing the dash 21. The indication of the code therefor reads —1. The manner in which the operation of the code is made to register a performance is illustrated by the several brief musical exercises in Figures 2 to 5 inclusive.

Consider Figure 2. This exercise consists of the four notes C, D, E, D. The C referred to is the one at the left in Figure 1 and is to be regarded as middle C. It is assumed that the indicator shields 23 and 24 are in the depressed position (Fig. 1) revealing the stationary dashes 21 and 22. Strike the key 2 agreeing with C, the first note of the exercise. This being a red marked key will cause the red shield 23 to show "1". Key 3 is struck next, agreeing with note D, and being a yellow marked key causes the yellow shield 24 to show "1". The key 4 is struck next, but being a "silent" key, produces no change in the indication. The key 3, agreeing with the note D, is struck last, again causing operation of the shield 24, so that this time it is depressed revealing the dash 22. A correct playing of the exercise in Figure 2 will result in the answer 1—.

The foregoing action of the key 3 makes it apparent to the reader that the alternate depressions and releases of the key will produce an alternate raising and lowering of the shield which is representative of the unit in which the key is situated. To make this plain, the first depression of the key 3 and its subsequent release caused the raising of the shield 24 in front of the dash 22. The next depression and release of the key 3 caused the lowering of the shield 24 to reveal the dash 22. A third depression and release of the same key would again cause the shield 24 to raise. This alternate action of the shield 24 is accomplished by the pawl 68 in riding down upon opposite sides of the cam 76 on the indicator arm 61 (Figs. 8 and 9).

A peculiar and valuable feature of the invention becomes apparent upon the second playing of the exercise in Figure 2. If repeated correctly the code symbols will read — —. The reason for this will be understood upon repeating the playing of the exercise. Consider the indicator code as reading "1—" which is the answer derived from the original playing of the exercise. A stroke and release of the key 2, agreeing with the note C, will cause depression of the shield 23. A stroke and release of key 3, agreeing with the note D will raise the shield 24. Stroke and release of key 4, agreeing with the note E, will produce no change in the indication, and a final stroke and release of the key 3, agreeing with note D, will cause depression of the shield 24 and so revealing both dashes 21 and 22 to produce the code symbols (or indication) mentioned.

No matter what the indication is after an exercise has been performed once correctly, the second correct performance will always show "— —". An exercise may consist of one or two notes or note combinations, or thousands of them for that matter. What holds good for playing an exercise twice correctly and then to show "— —" as an answer holds good for playing the same exercise any even number of times, for example, two, four, six, eight, ten, etc. On the other hand, playing the exercise any odd number of times, as one, three, five, seven, etc. must always result in the same indications as the answer derived from playing it once provided, always, that the exercise has been played correctly or the same each time.

"Same" has reference to correct notes and not to speed. By "same" is also meant correct legato (meaning joined or connected), "staccato" (meaning detached) and phrasing marks of the music. However, the legato, staccato, etc. marks do not show in all note successions when played on this machine, but they apply to a succession of notes that belong to the same unit. This is illustrated by exercise in Figure 3. This exercise has the slur over the four notes G, B, D, B as a legato mark, and the indicator 24 when played correctly, will only move once, and that after final note is released, and it will show "1." The whole indication is now "—1", provided that no adjacent "speaking" key has inadvertently been struck.

Figures 4 and 5 are intended to show the differences in results when the same notes of various exercises are played in different ways. The exercise in Figure 4 is an example for staccato playing, and if played correctly the first time will result in the answer "1—". Played correctly a second time it will result in the answer "— —". Figure 5 illustrates an exercise wherein the notes are to be played legato, that is to say connectedly. The first correct playing results in the answer "—1"; the second correct playing "— —"; the third correct playing "—1" and so on.

The drawings show more of a piano keyboard than is necessary to disclose the principle of the invention because the principle is the same in one octave or more than one octave. For a full-size piano keyboard use will be made of a total of four indicators; two for the upper part (right) beginning with middle C, and two for the lower part (left) below middle C.

Refer now to Figure 1 and consider the C at the left as middle C. As stated before, this is the C used in the exercise in Figure 2. It is observed that Figure 1 shows two sets of keys bearing the letters C, D, E. These keys at the right form the lower part of the next octave above. If now the notes of the exercise in Figure 2 are played an octave higher than written, exactly the same answer "1—" is got as before because the speaking keys C, D are of the same units, respectively, as they are in the first octave.

This principle holds for all other speaking keys of the second octave and also for those of the third and fourth. In other words, every C, C#, F and A# in all octaves in the upper half of the piano keyboard may be considered a red marked key and operates in connection with the one transverse bar 42 that controls the red indicator. Again, every D, F#, G and B in all octaves of the upper half of the keyboard functions with the upper transverse bar 48 and yellow indicator.

The length of the transverse bars will be in proportion to the number of octaves that constitute a unit, and the number of tappets attached to each transverse bar must be four for each octave of units, which makes it eight for two octaves, twelve for three octaves, etc.

The mechanism for the lower half of the keyboard is simply a duplication of the upper, requiring two transverse bars, etc. and two indicators.

The manner in which the indicating device is incorporated in the piano is subject to considerable change, but for purposes of illustrating a window is generally designated at W in Figures 1, 8 and 9.

The reasons for illustrating keys 9, 10, 11, 17 and 18 (Fig. 1) in addition to the octave embraced by keys 2 to 8 inclusive is to illustrate how certain similar keys of each octave are connected with one or the other of the transverse bars 42 and 48 to produce an action of either the red or yellow indicator shield 23 or 24. The additional keys mentioned in Figure 1 include C, C# and D. Both C and C# of the fragmentary higher octave are capable of operating the bar 42 the same as the C and C# of the lower octave. The same principle prevails in the instance of the Ds.

Each octave will involve the use of eight of the tappets 36, 37, 38, etc. Certain ones of the keys in each octave are "silent" but the eight tappets are accounted for when it is considered that each octave actually includes twelve keys, seven white and five black. In making this count the key 9 (Fig. 1) is not included, because it is practically the beginning of the succeeding octave.

The method herein involved is that of registering the performance upon the keyboard. The original correct playing of an exercise will result in a certain combination of the symbols on the indicating device, and all similar odd numbers of playings will result in the same indicator answer. The second correct playing of the exercise will always result in the answer "— —" and all subsequent even numbers of correct playings will result in the same answer. The indicating device therefore furnishes a visual indication—within certain limitations—as to whether the performance was correct.

Now as to these limitations. No claim is made that obtaining correct answer in performing a musical exercise is positive proof that no mistake has been made, as correct indication may be a matter of coincidence, or chance. The chances of getting right answer in spite of mistakes are 1 out of 4 on a machine having 2 indicators; on a machine with 4 indicators and when both the upper and lower sides of piano are used they are 1 out of 16. But for all practical purposes the answers furnished by the indicator may be considered fully sufficient to make its use prove helpful to the music student.

While the construction and arrangement of the keyboard indicating device is that of a generally preferred form, obviously modifications and changes may be made without departing from the spirit of the invention or the scope of the appended claims.

I claim:—

1. In combination with the keyboard of a musical instrument, an indicating device including the symbols of a code, and means for operating said device by the action of the keys to produce such combination of the indicator symbols as will indicate the correct rendering throughout a given exercise.

2. In combination with the keyboard of a musical instrument, an indicating device comprising a stationary member and a plurality of movable shields each having the symbols of a code, and means for moving the shields in respect to the stationary member by the action of the keys thereby to produce such combination of the symbols as will indicate the correct rendering throughout a given musical exercise.

3. In combination with the keyboard of a musical instrument, an indicating device comprising a stationary member and a plurality of shields having symbols of a code, a plurality of plungers having means for moving the shields in front of the stationary member whereby to either obscure or reveal one or more of the symbols thereon, and means operated by the keys when in action to reciprocate the plungers and cause said movement of the shields resulting in a final combination of symbols indicating the correct execution of a given musical exercise.

4. In combination with the keyboard of a musical instrument, an indicating device comprising a stationary member and a plurality of shields each having the symbols of a code, reciprocatory plungers for operating the indicating device, means for reciprocating the plungers by the action of the keys, a rockable mounting for the shields, and means carried by each of the plungers for rocking said mountings thereby to move the shields up or down in front of the stationary member as a given musical number is played upon the keyboard, resulting in a final combination of symbols in the indicating device designating correct playing.

5. In combination with the keyboard of a musical instrument, an indicating device comprising a stationary member and a plurality of movable shields, said member and shields carrying the symbols of a code, rockable arms by which the shields are carried, plungers, means by which the plungers are operated upon action of the keys, and means for so rocking the arms upon reciprocation of the plungers that the respective shields move up or down in front of the stationary member, either revealing or obscuring the symbols thereon, the relative positioning of the shields and stationary member producing a combination of symbols as will indicate the correctness of playing a given musical exercise.

6. In combination with the keyboard of a musical instrument, an indicating device comprising a stationary member having code symbols and a plurality of movable shields having code symbols, rockable arms by which the shields are carried, plungers, means for reciprocating the plungers by the action of the keys in executing a given musical exercise, and means on each of said plungers for independently rocking the arms and moving the respective shields up and down in front of the stationary member in alternation, first to obscure then to reveal the symbols involved, the final relative positioning of shields to the stationary member producing a code combination indicative of the correctness or incorrectness of said execution.

7. In combination with the keyboard of a musical instrument, an indicating device comprising a stationary member having code symbols and a plurality of shields having code symbols, rockable arms carrying the shields, a plunger for each arm, separate means for reciprocating the plungers upon action of certain groups of keys during the execution of a given musical exercise, and means carried by each plunger for converting the reciprocatory motion into an alternate up and down rocking motion of the respective shield thereby to alternately obscure and reveal the adjacent part of the stationary member, the final relative positioning of said shields and stationary member showing a symbol combination indicative of the correctness of playing the exercise.

8. In combination with the keyboard of a musical instrument, a plurality of transverse bars independently rockable by separate groups of each octave, an indicating device comprising a stationary member having symbols and a plurality of shields also having symbols, rockable arms by which the shields are carried, plungers reciprocable by each of the transverse bars upon action of any of the keys in the respective groups during the execution of a given musical exercise, and means carried by each plunger for individually rocking the arms to produce an alternate up and down movement of the respective shields in respect to the stationary member, the final relative positioning of the shields and stationary member revealing a symbol combination indicative of the correctness of playing said exercise.

9. In combination with the keyboard of a musical instrument, a pair of transverse bars each having tappets operable to rock the bars upon action of the keys in either of a pair of groups in each octave, an indicating device comprising a stationary member having symbols of one kind, a pair of shields having symbols of another kind, a pair of plungers each reciprocable by one of said transverse bars, rockable arms by which the shields are independently carried, and means on each of the plungers for alternately rocking the respective arm up and down to move the respective shield up and down in front of the stationary member upon action of any key in the respective group during the playing of a given musical exercise, the final relative position of shields and stationary member revealing a symbol combination indicative of the correctness of playing said exercise.

10. An indicating device comprising a stationary member having a plurality of symbols of one kind, a plurality of shields having symbols of another kind, rockable arms carrying the respective shields, a reciprocable plunger for each of the arms, a cam carried by each arm, a pivoted pawl carried by each plunger, and means for centering the pawl in respect to the plunger upon a movement in one direction for engagement with one or the other side of the respective arms and move the respective shields first up then down in respect to the stationary member to produce a symbol combination in said device.

11. An indicating device comprising a stationary member having symbols of one kind, a pair of shields having symbols of another kind, rockable arms carrying the shields, cams situated above and below the pivots of the arms, reciprocable plungers, means including a spring detent engageable with one side of one of the cams on each arm thereby to hold the arms in inclined positions, a pivoted pawl carried by each plunger and means to center the pawl upon the respective plungers upon a stroke in one direction so that upon a stroke in the opposite direction the pawl rides down one side of the upper cam on the arms causing rocking motion of the arms and an alternate up and down motion of the shield in respect to the stationary member to produce variable combinations of symbols.

12. An indicating device comprising a stationary member having symbols of one kind, a pair of shields having symbols of another kind, pivoted arms carrying the shields, cams above and below the pivots on each of the arms, means including spring detents engageable with the lower cams to hold the arms in such position as they may be inclined by holding the respective shields either in covering or revealing relationship to the stationary member, plungers, a pivoted pawl on each of the plungers, means for reciprocating the plungers to cause rocking movement of the arms, and twin springs carried by each plunger having common connection with the respective pawls for centralizing the pawl in respect to the plunger upon a stroke in one direction, said pawl upon the return stroke of the plunger riding down one side of the upper cam to rock the respective arms for a change in the inclination thereby causing the shields to alternately cover and reveal the stationary member and produce various symbol combinations.

13. The herein described method consisting of segregating certain keys of a musical instrument into units, causing the operation of an indicating device by the action of the keys in executing a given musical exercise and producing the symbols of a prearranged code at said device in varied combinations determined by the number of strokes upon the keys in said units.

14. The herein described method consisting of segregating certain keys of a musical instrument including a piano into units, said units constituting "speaking" keys, and causing motion in alternately opposite directions of moving shields in respect to the stationary member of an indicating device by the action of the keys in said several units, each shield carrying the symbol "1" and said stationary member the symbol "— —", said symbols producing various combinations determined by the number of strokes upon the keys in the several units.

JOHN STAUSS.